United States Patent [19]

Sypula et al.

[11] Patent Number: 5,525,446
[45] Date of Patent: Jun. 11, 1996

[54] INTERMEDIATE TRANSFER MEMBER OF THERMOPLASTIC FILM FORMING POLYMER LAYER LAMINATED ONTO A BASE LAYER

[75] Inventors: Donald S. Sypula; Joseph Mammino; Shyshung Hwang, all of Penfield; Gerald M. Fletcher, Pittsford; Edwin A. Urbanek, Penfield; Frank J. Bonsignore, Rochester; Donald J. Robertson, Fairport, all of N.Y.

[73] Assignee: Xerox Corporation, Stamford, Conn.

[21] Appl. No.: 318,484

[22] Filed: Oct. 5, 1994

Related U.S. Application Data

[63] Continuation of Ser. No. 139,068, Oct. 21, 1993, abandoned, which is a continuation of Ser. No. 961,969, Oct. 16, 1992, abandoned.

[51] Int. Cl.$^6$ .................. H01M 2/00; H01M 10/34; H01M 10/12; H01M 6/04
[52] U.S. Cl. .................. 430/47; 430/48; 430/56; 430/58; 430/59; 430/64; 430/126
[58] Field of Search .................. 430/56, 58, 59, 430/64, 109, 126, 47, 48; 428/195

[56] References Cited

U.S. PATENT DOCUMENTS

| | | | |
|---|---|---|---|
| 2,990,278 | 6/1961 | Carlson | 430/124 |
| 3,374,769 | 3/1968 | Carlson | 118/641 |
| 3,591,276 | 7/1971 | Byrne | 355/3 |
| 3,893,761 | 7/1975 | Buchan et al. | 355/272 |
| 3,954,568 | 5/1976 | DuPree | 205/73 |
| 3,957,367 | 5/1976 | Goel | 355/4 |
| 4,183,658 | 1/1980 | Winthaegen | 355/3 BE |
| 4,430,412 | 2/1984 | Miwa et al. | 430/126 |
| 4,501,646 | 2/1985 | Herbert | 204/4 |
| 4,518,976 | 5/1985 | Tarumi et al. | 346/153.1 |
| 4,531,825 | 7/1985 | Miwa et al. | 355/3 TR |
| 4,556,309 | 12/1985 | Weber et al. | 355/271 |
| 4,664,995 | 5/1987 | Horgan | 430/59 |
| 4,684,238 | 8/1987 | Till et al. | 355/10 |
| 4,690,539 | 9/1987 | Radulski et al. | 355/3 TR |
| 4,740,798 | 4/1988 | Shinoazaki | 346/76 PH |
| 4,747,992 | 5/1988 | Sypula et al. | 264/130 |
| 4,814,822 | 3/1989 | Acquaviva et al. | 355/14 SH |
| 4,952,293 | 8/1990 | Sypula et al. | 204/180.7 |
| 4,983,481 | 1/1991 | Yu | 430/58 |
| 5,008,167 | 4/1991 | Yu | 430/56 |
| 5,021,309 | 6/1991 | Yu | 430/59 |
| 5,028,964 | 7/1991 | Landa et al. | 430/126 |
| 5,055,366 | 10/1991 | Yu | 430/58 |
| 5,073,434 | 1/1991 | Frank | 428/195 |
| 5,099,286 | 3/1992 | Nishise et al. | 355/272 |
| 5,103,260 | 4/1992 | Tompkins et al. | 355/208 |
| 5,110,702 | 5/1992 | Ng et al. | 430/99 |
| 5,119,134 | 6/1992 | Haneda et al. | 355/212 |
| 5,119,140 | 6/1992 | Berkes et al. | 355/273 |
| 5,149,609 | 9/1992 | Yu | 430/58 |
| 5,158,846 | 10/1992 | Bujese | 430/47 |
| 5,223,361 | 6/1993 | Mishra | 430/58 |
| 5,243,392 | 9/1993 | Berkes et al. | 430/126 |
| 5,298,956 | 3/1994 | Mammino et al. | 430/126 |
| 5,308,725 | 3/1994 | Yu | 430/56 |

OTHER PUBLICATIONS

1985 Desk Manual, Lake publishing p. 173.

*Primary Examiner*—Susan W. Berman
*Attorney, Agent, or Firm*—Oliff & Berridge

[57] ABSTRACT

An intermediate transfer member includes a base layer and a top thermoplastic film forming polymer layer. The base layer can include carbon and the thermoplastic film forming polymer layer can include electrical property regulating materials. This intermediate transfer member shows improved mechanical as well as electrical properties. It can be employed in an electrophotographic imaging device having at least one photoreceptor and can print an image on a suitable substrate such as paper with improved toner image formation.

20 Claims, No Drawings

INTERMEDIATE TRANSFER MEMBER OF THERMOPLASTIC FILM FORMING POLYMER LAYER LAMINATED ONTO A BASE LAYER

This is a continuation of application Ser. No. 08/139,068 filed Oct. 21, 1993, now abandoned, which in turn is a continuation of application Ser. No. 07/961,969 filed Oct. 16, 1992, now abandoned.

BACKGROUND OF THE INVENTION

This invention relates in general to intermediate transfer members for electrostatic transfer of a toned image, particularly to intermediate transfer members having a top layer of a thermoplastic film forming binder coated onto a bottom film base layer, and processes for preparing the same.

Intermediate transfer members enable a higher reproduction rate for color images using a four color system as compared to those without intermediate transfer members. Furthermore, registration of the final color toner image is improved.

In such multicolor systems, component colors such as cyan, yellow, magenta, and black are synchronously developed onto one or more xerographic imaging members and transferred in registration onto an intermediate transfer member at a transfer station. The composite color image is then transferred to a receiving surface or substrate such as paper.

Intermediate transfer members employed in imaging apparatuses in which a developed image is first transferred from the imaging member to the intermediate transfer member and then transferred from the intermediate transfer member to a substrate should exhibit both good transfer of toner material from the imaging member to the intermediate transfer member and good transfer of toner material from the intermediate transfer member to the substrate. Good transfer occurs when most or all of the toner material comprising the image is transferred and little residual toner remains on the surface from which the image was transferred. Good transfer is particularly important when the imaging process involves generating full color images by sequentially generating and developing images in each primary color in succession and superimposing the primary color images onto each other on the intermediate transfer member, since undesirable shifting or color deterioration in the final colors can occur when the primary color images are not accurately and efficiently transferred from the intermediate transfer member to the substrate.

Examples of an intermediate transfer member can be found in U.S. Pat. No. 5,110,702 which discloses non-electrostatic transfer of a toned image using a roll as an intermediate transfer member, and in U.S. Pat. No. 3,893,761 which discloses an intermediate transfer belt having a polyamide film substrate coated with 0.1 to 10 mils of silicone rubber or a fluoroelastomer.

U.S. Pat. Nos. 4,684,238 and 4,690,539 disclose single layer intermediate transfer belts composed of polyethylene terephthalate or other suitable propylene material.

U.S. Pat. No. 5,119,140 discloses a single layer intermediate transfer belt preferably fabricated from clear Tedlar, carbon loaded Tedlar or pigmented Tedlar.

U.S. Pat. No. 5,099,286 discloses an intermediate transfer belt comprising electrically conductive urethane rubber reportedly having a volume resistivity of $10^3$ to $10^4$ ohm-cm and a dielectric layer of polytetrafluoroethylene reportedly having a volume resistivity equal to or greater than $10^{14}$ ohm-cm.

Although there are a number of intermediate transfer members employed in imaging apparatuses, there is still a need for intermediate transfer members with improved mechanical strength and electrical properties which enable generation of full color images with high color fidelity.

SUMMARY OF THE INVENTION

The present invention is directed to an intermediate transfer member for an electrostatographic imaging system comprising a layer of a thermoplastic film forming polymer residing on a film base layer. The thermoplastic film forming polymer layer can comprise filler material such as electrical property regulating material and the film base layer may be loaded with material such as carbon. The intermediate transfer member of the present invention also comprises an adhesive layer between the thermoplastic film forming polymer layer and the base layer. This intermediate transfer member has good electrical and mechanical properties and can transfer color separated toner images from one or more photoreceptors to a receiving substrate in good registration.

The present invention is also directed to an electrostatographic imaging process comprising: a) forming an electrostatic latent image on an image forming device; b) forming a toner image on said image forming device in conformance with said electrostatic latent image; c) transferring said toner image from said image forming device to an intermediate transfer member, said intermediate transfer member consisting essentially of a top layer of a thermoplastic film forming polymer having charge relaxation particles disposed therein and a charge enabling film base layer, said top layer being laminated, optionally with an adhesive layer, onto the base layer; and d) transferring said toner image from said intermediate transfer member to a receiving substrate.

DESCRIPTION OF PREFERRED EMBODIMENTS

The intermediate transfer member of the present invention comprises two layers bonded together by an adhesive layer. The top layer has the proper electrical properties for charge dissipation which is necessary for toner image transfer. The bottom layer may be resistive but enables charge to be conducted to ground without presenting a significant ground plane to the top layer or charge can be conducted to a source of applied potential. The bottom layer also may be conductive and at ground. If the bottom layer is resistive, it is preferably composed of a polycarbonate film. The polycarbonate film layer constitutes from about 25% to about 95% by weight of the member, preferably from about 50% to about 90% by weight of the member. The thickness of the polycarbonate film layer ranges from about 0.5 mils to about 10 mils, preferably about 1 mil to about 5 mils. The member can be in the form of an endless belt, roll or scroll.

Any suitable polycarbonate may be employed to form the bottom layer of the intermediate transfer member. Suitable polycarbonate resins include, but are not limited to, resins having a molecular weight from about 20,000 to about 120,000, more preferably from about 50,000 to about 100,000. Examples of such polycarbonate resins employed as the bottom layer of the intermediate transfer member are poly(4,4'-dipropylidene-diphenylene carbonate) with a molecular weight of about 35,000 to about 40,000, available as Lexan 145 from General Electric Company; poly(4,4'-isopropylidene-diphenylene carbonate) with a molecular weight of about 40,000 to about 45,000 available as Lexan 141 from General Electric Company; a polycarbonate resin having a molecular weight of from about 50,000 to about 100,000, available as Makrolon from Farben Fabricken Bayer A.G.; a polycarbonate resin having a molecular weight of from about 20,000 to about 50,000 available as Merlon from Mobay Chemical Company; polyether carbonates; and 4,4'-cyclohexylidene diphenyl polycarbonate. Polycarbonate polymers suitable for practicing this invention also can be made, for example, from 2,2-bis(4-hydroxyphenol)propane; 4,4'-dihydroxy-diphenyl- 1,1-isobutane; 4,4'-dihydroxy-diphenyl-4,4-heptane; 4,4'-dihydroxy-diphenyl-2,2-hexane; 4,4'-dihydroxy-triphenyl-2,2,2-ethane; 4,4'-dihydroxy-diphenyl-1,1-cyclohexane; 4,4'-dihydroxy-diphenyl-β-β-decahydronaphthalene; 4,4'-dihydroxy-diphenyl-sulphone and the like.

The polycarbonate film layer can be extrusion molded then coated with an adhesive and a thermoplastic film forming polymer using coating techniques known in the art. Alternatively, the polycarbonate layer can be applied to a mandrel or electrodeposited on a surface of an electrode then coated with an adhesive and a film forming polymer. Polycarbonate film forming polymers may be solvent soluble, solvent dispersible or molten during application to a mandrel. The polycarbonate should be capable of forming a uniform fluid coating on the mandrel. The polycarbonate coating may be formed by the application to the mandrel of the polycarbonate in a solution, dispersion or emulsion. The final solid member may be formed by curing to polymerize the polycarbonate, drying to remove solvent from the polycarbonate or merely cooling molten polycarbonate below its glass transition temperature ($T_g$).

Although the polycarbonate may be applied in a molten state, a liquid carrier is preferably employed to form a solution, dispersion or emulsion of polycarbonate film, the combination of both the liquid carrier and polycarbonate film having a lower surface tension than the polycarbonate film free of liquid carrier. Thus the surface tension of the applied coating is increased upon drying. In order to achieve a uniform fluid coating comprising a liquid carrier and polycarbonate film, the fluid coating should have a surface tension higher than that of the mandrel surface being coated. A surface tension of the mandrel surface should be low and preferably below about 31 dynes/cm to facilitate removal of the member from the mandrel.

Any suitable material may be used for the mandrel. The mandrel should be dimensionally and thermally stable at processing temperatures utilized, i.e., about 20° C.–130° C. It should also be insoluble in any carrier employed and should not react chemically with the polycarbonate or other components thereof. The mandrel may be uncoated or, if desired, be coated with a suitable release coating well known in the art prior to applying the polycarbonate. Typical mandrel materials include metals such as aluminum, stainless steel, nickel, chromium, copper, brass and the like. Typical polymeric mandrel materials include polyethylene, polypropylene, polymethylpentane, copolymers thereof and the like. Typical ceramic mandrel materials include ceramic, glass, clay and the like.

The polycarbonate film layer can be formed by electrodepositing particles of polycarbonate material on a suitable electrode. If the polycarbonate film layer is formed by electrodeposition, electrical conducting materials are incorporated into polycarbonate particles prior to electrodeposition. For example, these particles include, but are not limited to barium titanate, tin oxide, antimony tin oxide, calcium silicate and the like, as disclosed in U.S. Pat. No. 4,952,293, the entire disclosure of which is hereby incorporated herein by reference. The conductive particles comprise from about 1.0% by weight to about 80% by weight of the final polycarbonate layer, preferably from about 5.0% by weight to about 80% by weight of the polycarbonate layer.

Generally, the electrodeposition process involves providing at least one sleeve electrode coaxially spaced apart from at least one other electrode in a bath comprising a dispersion of electrically charged polycarbonate film forming particles in an organic liquid dispersion medium, the polymer particles being substantially insoluble in the organic dispersion at electrodeposition temperatures and sufficiently soluble in the organic dispersion liquid medium at temperatures exceeding electrodeposition temperatures to coalesce and form a viscous coating; applying an electric field across the electrodes until a fixed substantially uniform deposit of polymer particles forms on the interior surface of the sleeve electrode; removing the sleeve electrode bearing the deposit of polymer particles and residual liquid dispersion medium clinging to the deposit of polymer particles from the bath; heating the deposit to initially solubilize the polymer particles and residual organic liquid dispersion medium to form a coalesced, continuous, viscous, sol coating of solubilized polymer particles; continuing the heating to evaporate residual organic liquid dispersion medium and form a continuous, solidified, dry, cylindrical polymer film; and removing the continuous, dry polymer film from the interior surface of the sleeve electrode. A particularly preferred electrodeposition process is described in U.S. Pat. No. 4,952,293, the entire disclosure of which is hereby incorporated herein by reference.

Other suitable methods well known in the art may be practiced to form the polycarbonate film layer. Such alternative methods include, but are not limited to, extrusion processing where a die tool is prepared from metal hardware with an extrusion slot that has the width and thickness dimensions of the film which is to be prepared. The polycarbonate resin is dried of moisture and compounded with fillers which can include those for conductivity modification, colorants and flow modifying processing aides. The polycarbonate plastic compound is extruded though the die tool after being melted and the extruded film is allowed to cool to below its Tg, forming the solid film material.

Carbon, for example in the form of carbon black or graphite, can be loaded in polycarbonate to enable charge carriers to pass into the polycarbonate layer from the top layer and charge to be dissipated to ground potential. Dissipation of charge to ground potential prevents charge from building up to unacceptable levels during repeated image transfer to and from the intermediate member. High electrical charge levels on the intermediate member would result in difficulty in transfer of toner images to the intermediate member and degradation of toner images. Therefore, for high toner image quality and the ability to transfer successive toner images onto each other with good registration, electrical charge must be dissipated from the surface of the intermediate member through the bulk of the intermediate member material to ground potential. This is a very reliable and efficient method for charge dissipation from the intermediate member material. Other suitable charge carriers include, but are not limited to, tin, aluminum, iron, chromium and their oxides.

Typically, carbon black can be employed in amounts of about 5% to about 15% by weight of the intermediate transfer member, preferably from about 5% to about 12% by weight. Aluminum, iron, chromium and their oxides can be employed in amounts of about 24% to about 52% by weight of the intermediate transfer member, preferably from about 24% to about 35% by weight.

The charge carrier material can be incorporated into polycarbonate by any suitable method. For example, carbon can be extrusion molded with polycarbonate during film formation or it can be added to solutions, dispersions or emulsions of polycarbonate prior to film formation.

If the base layer is conductive, it is preferably made of metal which provides good mechanical strength to the intermediate transfer member. The metal support member can comprise from about 43.8% by weight to about 97.9% by weight of the intermediate transfer member, preferably from about 82.3% by weight to about 93.2% by weight. The thickness of the metal base layer can range from about 0.5 mils to about 5.0 mils, preferably from about 2.0 mils to about 3.0 mils.

Suitable metals which can be employed to make the film base layer include, but are not limited to, nickel, copper, aluminum, cobalt, tin, titanium, zinc, chromium, steel such as stainless steel, and alloys thereof.

The metal base layer can be prepared according to any suitable method. Typically the metal member can be electrodeposited on a mandrel or on a sleeve electrode as described in U.S. Pat. Nos. 3,954,568 and 4,501,646, the entire disclosures of which are hereby incorporated herein by reference.

Other suitable methods known in the art may be practiced to form the metal support member. Such alternative methods include, but are not limited to, roll milling heated steel or stainless steel to obtain the final thickness. Furthermore, the molten metal can be extruded onto a suitable carrier form followed by further sizing either by roll or press to obtain the desired film thickness.

The top layer of the intermediate transfer member comprises a laminated layer of a thermoplastic film forming polymer. The thermoplastic film forming polymer layer ranges from about 0.5 mils to about 3 mils in thickness, preferably from about 1 mil to about 2 mils in thickness. Suitable thermoplastic resins which can be employed include, but are not limited to, polyvinyl fluoride (e.g., Tedlar, available from E. I. du Pont de Nemours & Co.); polyvinylidene fluoride (e.g., Kynar 202 available from Pennwalt Co.); polyvinyl chloride; polyethylene; polypropylene; polyethers; styrene-butadiene copolymers; polybutylenes; and the like. Other suitable thermoplastic film forming polymers include polyamides (e.g., nylon); polyesters (e.g., PE-100 and PE-200, available from Goodyear Tire and Rubber Company); polysulfones (e.g., P-3500, available from Union Carbide Corp.); polysulfides; cellulosic resins; polyarylate acrylics; polyaryl sulfones; polyphenylene sulfides; polyurethanes; polyimides; epoxys; poly(amide-imides) (e.g., Torlon Polymer A1830, available from AMOCO Chemical Corporation); copolyesters (e.g., Kodar Copolyester PETG 6763 available from Eastman Kodak Co.); polyethersulfones; polyetherimides (e.g., Ultem available from General Electric Company); polyarylethers; and the like.

The thermoplastic film forming top layer can be prepared by extrusion processing where resin is prepared in a molten state and forced under pressure through an extrusion die tool which has the desired opening width and gap corresponding to the width and thickness of the desired extruded film. The extruded thermoplastic film is allowed to cool to near room temperature and cut to an appropriate width for the end use application. An alternative method involves forming a preform from thermoplastic resin such that it can be inserted into a cavity and expanded by air pressure to the inside dimensions of the cavity which are the final dimensions of the exterior of the desired film. Appropriate methods are well known in the art.

Thermoplastic film forming polymers can comprise electrical property regulating particles which provide proper electrical properties for the intermediate member such as charge relaxation. Charge relaxation is dissipation of surface or internal space charge from the thermoplastic film forming polymer. This is done by conduction of electrical charges from electrical property regulating materials in the thermoplastic film to a ground plane located on one side of the thermoplastic film material. The conduction of charges is done either electronically or ionically to include the hopping mechanism and band gap permeation. Charge on the member relaxes between transfer stations to allow effective transfer of the image from the image receiving member or photoreceptor to the intermediate transfer member.

Charge relaxation between imaging stations will generally require a volume resistivity of the top layer near $10^{12}$ ohm-cm, preferably below about $10^{12}$ ohm-cm. A resistivity above about $10^{10}$ ohm-cm is preferred for good transfer to high relative humidity conditioned papers, and it is also desired to help avoid arcing between the more conductive bottom base layer of the transfer member and electrically weak regions on the image forming photoconductors or bias transfer members that may be used with the transfer member of the present invention. Charge relaxation is not a requirement if the dielectric thickness (top layer thickness/dielectric constant) is less than about 15 microns and if charge neutralizing devices are suitably employed in the transfer process to substantially neutralize cyclic charge buildup that can accumulate on the top layer material during the toner transfer steps. Charge neutralization via, for example, corotrons, scorotrons or conductive brush devices is well known in the art and can be used with the top layer materials that do not substantially relax charge via conduction. If the top layer resistivity is above about $10^{12}$ ohm-cm and the top layer dielectric thickness is larger than about 15 microns, charge neutralization in a multicolor imaging process becomes difficult to reliably manage and image transfer stability can degrade. Although about a 15 micron dielectric thickness can be utilized in this invention, a lower dielectric thickness from about 2–10 microns is preferred when the top layer resistivity is above about $10^{12}$ ohm-cm. If volume resistivity is below $10^{12}$ ohm-cm, charge buildup will not be a problem, and the dielectric thickness of the top layer can be as large as about 200 microns. Charge relaxation, the dielectric constant, or both properties can be suitably regulated for the top layer by electrical property regulating particles incorporated within the thermoplastic film.

These electrical property regulating particles can be incorporated within the thermoplastic film forming polymer during formation of the thermoplastic film forming layer. Typical particles include, but are not limited to, barium titanate, titanium dioxide, tin oxide, antimony tin oxide, calcium silicate (Wollastonite 200, available from NYCO Division of Processed Minerals, Inc., N.Y.), magnetite, ultra marine blue, cobalt aluminate blue, chrome-cobalt-aluminate, chromium oxide, metal or metal-free phthalocyanines, quinacridones, diarylide yellow pigments, iron oxide, titanium-chrome oxide, zinc oxide, cadmium sulfoselenide and the like, and mixtures thereof.

These particles can be incorporated within thermoplastic film forming polymers by any suitable technique. Typical incorporation methods include roll milling, mechanical mixing, melt mixing and the like. Generally, the amount of electrical property regulating particles added to the thermoplastic film forming polymer ranges from about 10% to about 15% by weight of the belt, preferably from about 11% to about 12% by weight of the belt. The volume resistivity of the top layer of the intermediate member of the present invention is preferably above about $10^{10}$ ohm-cm to below about $10^{12}$ ohm-cm to allow electric fields to be slowly relaxed to acceptable levels by migration of electrical charges from the surface and bulk of the overcoat film to the more conductive base layer. This slower rate of relaxation of the electric field enables specific process times and speeds for image preparation providing for good image resolution. In order to use materials with a volume resistivity above about $10^{12}$ ohm-cm, the dielectric thickness of the top layer of the intermediate member preferably is selected to be sufficiently low by either decreasing the thickness of the top layer or increasing the dielectric constant. Higher dielectric constant material can be employed to allow higher thickness for the top layer. The dielectric constant of the top layer of the intermediate member of the present invention, due to either inherent properties or due to electrical property regulating material, is preferably at least 3 units, more preferably greater than about 8 units. In particular, the dielectric constant for an intermediate member comprising titanium dioxide is preferably about 10 to about 12 units.

The adhesive layer which binds the thermoplastic film forming layer to the base layer ranges from about 0.2 mils to about 1 mil, preferably from about 0.25 mils to about 0.5 mils.

Typical adhesive layers include film-forming polymers such as acrylic adhesives such as methacrylate resins, methacrylate copolymer resins, ethyl methacrylate resins, butyl methacrylate resins and mixtures thereof as disclosed in Dupont Elvacite Acrylic Resins pamphlet obtainable from E. I. du Pont de Nemours and Co. the entire disclosure of which is hereby incorporated herein by reference. Also, du Pont 68080, 68070 and 68040 acrylic blends, polyesters such as du Pont 49,000 resin (available from E. I. du Pont de Nemours & Co.), Vitel PE-100 (available from Goodyear Rubber & Tire Co.), polyvinylbutyral, polyvinylpyrrolidone, polyurethane, polymethyl methacrylate and the like can be employed. Both the du Pont 49,000 and Vitel PE-100 adhesive layers are preferred because they provide reasonable adhesive strength and produce no deleterious impact on the resulting intermediate transfer member.

Du Pont 49,000 is a linear saturated copolyester of four diacids and ethylene glycol having a molecular weight of about 70,000 and a glass transition temperature of about 32° C. Its molecular structure is represented as

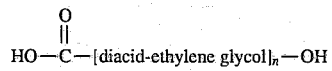

where n is a number which represents the degree of polymerization and gives a molecular weight of about 70,000. The ratio of diacid to ethylene glycol in the copolyester is about 1:1. The diacids are terephthalic acid, isophthalic acid, adipic acid and azelaic acid in a ratio of about 4:4:1:1.

Vitel PE-100 is a linear copolyester of two diacids and ethylene glycol having a molecular weight of about 50,000 and a glass transition temperature of about 71° C. Its molecular structure is represented as

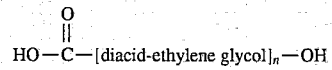

where n is a number which represents the degree of polymerization and gives a molecular weight of about 50,000. The ratio of diacid to ethylene glycol in the copolyester is about 1:1. The two diacids are terephthalic acid and isophthalic acid in a ratio of about 3:2.

Du Pont 49,000 and Vitel PE-100 can be easily mixed to form a polymer blend. When coated one over the top of the other, they adhere to each other so strongly that they become practically inseparable. Accordingly, it is preferred to use a combination of such chemically similar compounds because of their highly miscible and highly adhesive properties with one another.

Another polyester resin adhesive available from Goodyear Tire & Rubber Co. is Vitel PE-200. This polyester resin is a linear saturated copolyester of two diacids and two diols. The molecular structure of this linear saturated copolyester is represented by the following:

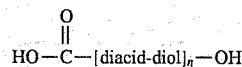

where the ratio of diacid to diol in the copolyester is about 1:1. The diacids are terephthalic acid and isophthalic acid in a ratio of about 1.2:1. The two diols are ethylene glycol and 2,2-dimethyl propane diol in a ratio of about 1.33:1. The Goodyear PE-200 linear saturated copolyester contains randomly alternating monomer units of the two diacids and the two diols and has a molecular weight of about 45,000 and a $T_g$ of about 67° C.

The adhesive layer also can optionally contain carbon black to make it have electrical properties similar to the electrical properties of a resistive bottom layer, and/or it can comprise other electrical property regulating particles to make it have electrical properties similar to the electrical properties of the thermoplastic film layer.

The adhesive layer may be applied to a surface of either the top thermoplastic film layer or bottom film base layer by dissolving adhesive material in an appropriate solvent, applying by hand, spraying, dip coating, gravure coating, silk screening, vacuum deposition, roll coating, wire wound rod coating and the like, then drying to remove any solvent. Drying temperatures can range from about 20° C. to about 120° C.

The adhesive side of the coated film layer is placed in close contact with a surface of the non-coated film layer with no air space between the films. A laminator such as a du Pont Co. HRL-24 Riston laminator (obtainable from E. I. du Pont de Nemours and Co.) can be used for this processing. Heat generated during the lamination process melts the adhesive to the non-coated film layer. The member is then cooled to room temperature to bind the two layers together. If one layer is metal, the coated and non-coated layer are rolled onto each other and placed into an oven at about 170° C. to about 204° C. for about 1 min. to about 5 min., preferably from about 4–5 min., to melt the adhesive and bond the layers together.

Alternatively, the thermoplastic film forming polymers may be deposited on the adhesive layer bonded to the base layer from solutions, dispersions or emulsions by any suitable technique. Typical techniques for depositing thermoplastic film forming polymers on the adhesive layer include spray coating, dip coating, wire wound rod coating, powder coating, electrostatic spraying, sonic spraying, blade coating and the like.

A typical spray gun which can be employed to spray coat the thermoplastic film forming polymer on the adhesive has a central fluid nozzle surrounded by an annular concentric air nozzle. The fluid is forced out through the fluid nozzle either by a vacuum created by gas flow through the annular concentric nozzle or by pressurizing the fluid container. A typical spray gun having these features is a Model 21 spray gun available from Binks Company, Franklin Park, Ill. as described in U.S. Pat. No. 4,747,992, the entire disclosure of which is hereby incorporated herein by reference.

The coating solutions that are applied by spraying are normally prepared by dissolving a polymer in a blend of low and high boiling point solvents. The low boiling point solvent flashes off rapidly during spraying to form a high viscosity film on the film base layer. The remaining high boiling point solvent allows the spray coating to flow and dry slowly to a uniform smooth film; minimizes trapped air from forming bubbles when subsequently heated; and prevents "blushing" due to condensation of water from low boiling solvents evaporating too rapidly. Combinations of low and high boiling point solvents include, but are not limited to, methylene chloride and 1,1,2-trichloroethane; methylethyl ketone and methylisobutyl ketone; isopropanol and isobutyl alcohol; methanol and water; tetrahydrofuran and toluene, and the like. Satisfactory results may be obtained with a mixture of from about 40 percent to about 80 percent by weight of low boiling point solvent and about 20 percent to about 60 percent by weight of high boiling point solvent. A low boiling point solvent is defined herein as a solvent having a boiling point less than about 80° C. and a high boiling point solvent is defined herein as a solvent having a boiling point of at least about 100° C.

If the base layer comprises a polycarbonate film, an anti-curl back coating can be applied to the polycarbonate layer opposite the film forming layer so that the belt remains flat in a cross-web direction. The anti-curl layer can comprise polymers that are electrically insulating or slightly semiconductive. The anti-curl layer provides flatness and/or abrasion resistance. The anti-curl layer can comprise a film forming resin and an adhesion promoter polyester additive. Examples of film forming resins include, but are not limited to, polyacrylate, polystyrene, polycarbonates such as poly(4,4'-isopropylidene-diphenylene carbonate), 4,4'-cyclohexylidene diphenyl polycarbonate and the like. Typical adhesion promoters used as additives include, but are not limited to, 49000 resin (DuPont), Vitel PE-100 and PE-200 (Goodyear), polyester, polyvinylbutyral, polyvinylpyrrolidone, polyurethane, polymethyl methacrylate and the like. The adhesion promoter comprises from about 1 to about 15% by weight of the anti-curl layer, preferably from about 5–10% by weight. The thickness of the anti-curl layer is from about 0.5 mils to about 2 mils, and preferably about 0.25 mil to about 1 mil.

Carbon black and other charge carrier materials also can be incorporated into the anti-curl back coating allowing injection of charge carriers into this material to provide conduction of charge to ground potential. Electrical property regulating materials also can be incorporated into the anti-curl layer to give it electrical properties such as charge relaxation. The charge carrier materials and electrical property regulating materials can be incorporated into the anti-curl back coating by any conventional method such as mechanical mixing, melt mixing, roll milling and dispersion methods and the like.

The base layer of the present invention can be conductive such as when the base layer comprises a metal or alloy, but preferably the base layer has good electrical properties such as volume resistivities of less than about $10^{12}$ ohms-cm, more preferably less than about $10^{10}$ ohms-cm and a surface resistivity of greater than about $10^7$ ohms/square. These volume and surface resistivities allow different potentials to be applied at different points along the transfer member before, during and past the transfer nips and at different photoreceptor stations to transfer toner onto the intermediate member and from the intermediate member to a substrate such as paper. These resistivities also produce greater latitude in preventing pre-nip voltage breakdown which results in toner scatter and image defects.

The base layer can be employed in an electrophotographic imaging system for electrostatic transfer of a toner image wherein the system comprises at least one image forming device. Typically, four image forming devices are utilized. An intermediate transfer member, such as an intermediate transfer belt, is supported for movement in an endless path such that incremental portions thereof move past the image forming device for transfer of an image from each image forming device. Each image forming device is positioned adjacent the intermediate transfer member for enabling sequential transfer of different color toner images to the intermediate transfer member in superimposed registration with one another. The image forming devices each comprise an image receiving member such as a photoreceptor about which are positioned image forming components of the imaging structure. The image forming components comprise exposure structures, developing structures, transfer structures, cleaning structures and charging structures. Charging structures can comprise conventional corona discharge devices.

Exposure structures employed can be any suitable type employed in the art. Typical exposure structures include, but are not limited to, raster input/output scanning devices or any combination using such devices. The light source employed can be any suitable light source employed in the art, such as a laser.

The intermediate transfer member moves such that each incremental portion thereof first moves past an image forming device. A color image component corresponding to a yellow component of an original document to be copied is formed on the image receiving member (e.g., photosensitive drum or photoreceptor) using the charging structure, the exposure structure and the developing structure. The developing structure develops a yellow toner image on the image receiving member. That member rotates and contacts the intermediate transfer member. A transfer structure, which can comprise a corona discharge device or a contacting bias conductive device, serves to effect transfer of the yellow component of the image at the area of contact between the receiving member and the intermediate transfer member.

In like fashion, a magenta image component corresponding to a magenta component of the original document and a cyan and black image also can be formed on the intermediate transfer member.

The intermediate transfer member is moved through a transfer station where the multicolored image is transferred to a sheet of transfer material or copy sheet. The sheet of transfer material is moved into contact with the toner image at a transfer station. The sheet is advanced to the transfer station by any suitable sheet feeding apparatus. For example, feed rollers rotate so as to advance the uppermost sheet from a stack of sheets into contact with the intermediate transfer member in timed sequence so that the toner powder image thereon contacts the advancing sheet at the transfer station. At the transfer station, a biased transfer roll may be used to provide high electrostatic fields and good contact between the sheet and the toner image during transfer. A corona transfer device also can be provided in place of or for assisting the biased transfer roll in effecting image transfer.

Suitable devices in which the intermediate transfer member of the present invention can be employed include, but are not limited to, devices described in U.S. Pat. Nos. 3,893,761; 4,531,825; 4,684,238; 4,690,539; 5,119,140 and 5,099,286, the entire disclosures of which are hereby incorporated herein by reference.

The intermediate transfer member of the present invention achieves good transfer efficiencies and has non-stretch characteristics thus enabling good registration of a toner image.

The following examples are provided to further illustrate this invention.

EXAMPLE I

A polycarbonate belt is prepared by dissolving a film forming polymer along with carbon black in a solvent mixture. The specific components and conditions for preparing the belt are as follows:

Film forming polymer: 33 grams polycarbonate resin (Merlon M- 39, available from Mobay Co.)

Carbon black: 0.55 grams of Black Pearls 2000 available from Cabot Corp., Billerica Ma.

Solvent: 522 grams methylene chloride and 600 grams 1,1,2-trichloroethane

Relative humidity: 42 percent

Drum surface speed: 72 inches per second

Nozzle to drum distance: 8 inches

Number of spray gun passes: 15

Fluid nozzle: 63B (nozzle designation)

Air nozzle: 63PE (nozzle designation)

Needle setting: 1.5

Fluid feed mode: Pressure pot

Ford No. 2 Cup viscosity: 26 seconds

Mandrel: A polyethylene tube having a smooth outer surface, a length of 12 inches, a diameter of 6 inches and a thickness of about 1/16 inch.

The coating solution is sprayed onto the surface of the polyethylene mandrel with a spray gun to form a thin uniform film through repeated spray passes. After attaining a desired thickness of about 5 mils and drying in a hot air oven at about 60° C. for about three hours followed by heating to about 120° C. for three hours, a coating of about 1 mil of polyurethane adhesive is blade coated on the surface of the polycarbonate film. A dispersion of 22 gm of polyvinyl fluoride (Tedlar, available from E. I. du Pont de Nemours & Co.) and 10 gm of titanium dioxide is prepared according to methods practiced in the art and sprayed onto the adhesive layer on the polycarbonate and carbon film layer to a thickness of about 1 mil.

After application of the polyvinyl fluoride and titanium dioxide coating, the composite belt is placed in a hot air oven at about 60° C. for about three hours to dry the dispersion of polyvinyl fluoride and titanium dioxide. The resulting belt is then placed in a hot air oven at about 170° C. for about three minutes to melt the adhesive so it binds to the polyvinyl fluoride filler and the polycarbonate layer together. The resulting belt has a polycarbonate layer with a volume resistivity of below about $10^{10}$ ohm-cm and a surface resistivity above about $10^7$ ohms/square and a polyvinyl fluoride layer with a volume resistivity of below about $10^{12}$ ohm-cm.

EXAMPLE II

A polyvinyl fluoride film having a thickness of 1 mil is coated with du Pont 68080 acrylic adhesive and protected with a removable release liner (polyethylene). A polycarbonate with carbon film is extrusion processed. The film has a thickness of about 5 mils and contains about 6% by weight of carbon. Immediately after the polycarbonate is formed by the extrusion process and while at or near the extrusion temperature, the adhesive side of the coated polyvinyl fluoride film is contacted to the smooth side of the polycarbonate with carbon film in a pressure roll nip to form a composite film. The composite film is evaluated for roll cycling on a Flex Test Fixture consisting of three 19 mm diameter rolls. The test is done on a 1.0 inch wide sample of the composite with a 2 lb tension loading. Two composite film samples as described above give in excess of 1.73 million flex cycles without failure. This indicates that the composite consisting of the polyvinyl fluoride film bonded onto the polycarbonate with carbon film has good cycling properties over small diameter rolls.

EXAMPLE III

Two types of films are prepared by placing the adhesive side of a coated polyvinyl fluoride film in close contact with a stainless steel film with no air spacing between the films. A du Pont HRL-24 Riston laminator is used for this processing. The polyvinyl fluoride and steel films are rolled onto each other and placed into an oven at about 190° C. for about 3 min. to melt the adhesive and bond the films to form the composite.

One film is made of a 1 mil thick polyvinyl fluoride film obtained from du Pont. The adhesive used is du Pont type 68080 hot melt acrylic adhesive with an activation temperature of about 390° to 400° F. The second film is made of a 2 mil thick polyvinyl fluoride film also from du Pont. The adhesive is du Pont type 68040 with a heat activation temperature of 300° C. to 500° C. These are coated onto the polyvinyl fluoride film.

The composites for intermediate transfer belt applications consisting of 1 and 2 mil polyvinyl fluoride with du Pont Co. type 68080 and 68040 adhesives are laminated onto 2.2 mil stainless steel films. Four belts are prepared with 1 mil polyvinyl fluoride on stainless steel film and five belts are prepared with 2 mil polyvinyl fluoride on stainless steel film. The HRL-24 laminator is used for placing the polyvinyl fluoride with adhesive in intimate contact with the stainless steel. The upper roll temperature is set at about 150° C. for the 1 mil polyvinyl fluoride film with 68080 adhesive and at about 165° C. for the 2 mil polyvinyl fluoride film with the 68040 adhesive.

After the polyvinyl fluoride film with adhesive is placed on the stainless steel film, they are placed in an oven at about 190° C. to melt the adhesive and bond it to the stainless steel. These composites are prepared into belts by welding the ends of the stainless steel film segment together.

A Flex Test is used to determine the number of passes that each belt could make over 19 mm diameter rolls. The test is done on a Flex Test Fixture which has three rolls which contact the 1.0 in. wide samples with a tension loading of 2 lbs. One belt which consists of 2 mil white polyvinylfluoride laminated onto 2.2 mil stainless steel with 68040 acrylic adhesive withstands up to 354K cycles over the three rolls with no degradation, i.e., splitting or cracking of the edge or interior region of the film. In addition, the welded seam on these belts is evaluated on a Flex Test Fixture for cycling over the rolls. The conditions are the same as above and the seam is located across the center of the belt sample. One belt with a seam fails after about 253K cycles while another goes 348K cycles with no failure. The failure of the welded seam occurs at the edge of the interface between the two segments of stainless steel that are butt joined. The Flex Test is also conducted on the welded seam of the belts that consist of 1 mil polyvinylfluoride laminated onto 2.2 mil stainless steel with 68080 acrylic adhesive and withstand up to 407K cycles on the three rolls.

These results indicate that a durable belt consisting of 1 mil polyvinyl fluoride film and 2 mil polyvinyl fluoride film bonded to 2.2 mil stainless steel film with an acrylic adhesive can be prepared by the lamination process with oven heating to activate the hot melt adhesive. The bond between the films is very good and gives a large number of cycles over 19 mm diameter rolls. The stainless steel film material of the composite can be welded to form a composite belt film for use as an intermediate transfer belt.

EXAMPLE IV

An 80 inch long belt, consisting of 1 mil polyvinyl fluoride film bonded to 2.2 mil stainless steel film with du Pont 68080 acrylic adhesive as prepared in Example III, is installed in a breadboard as an intermediate belt for transferring color separated toner images from photoreceptors to a receiver paper. The breadboard is a process color xerographic printing device which has individual cyan, magenta, yellow and black toner monochrome print stations operating in tandem. Color separated toner images are prepared on photoreceptors at the monochrome print stations and transferred in registration to the encompassing intermediate belt to form a polychrome toner image and then onto a receiver paper.

For transferring images a potential difference, typically about 1,000 volts are provided between the stainless steel belt and the photoreceptor drum shafts. This low voltage minimizes the emission of ozone in the machine.

Because of minimal stretch of the stainless steel under the applied belt tension, this intermediate belt shows good color registration. Typically, variation in the color registration caused by the stretch of the stainless steel under the applied belt tension of 1 lb/in in the process direction is less than about 1 mil.

We claim:

1. An electrostatographic imaging process comprising:
   a) forming an electrostatic latent image on an image forming device;
   b) forming a toner image on said image forming device in conformance with said electrostatic latent image;
   c) transferring said toner image from said image forming device to an intermediate transfer member, said intermediate transfer member consisting essentially of a top layer of a thermoplastic film forming polymer having charge relaxation particles disposed therein and a charge enabling film base layer, said top layer being laminated, optionally with an adhesive layer, onto the base layer; and
   d) transferring said toner image from said intermediate transfer member to a receiving substrate.

2. An electrostatographic imaging process according to claim 1, wherein said intermediate transfer member dissipates charge from an outer surface of the top layer of said intermediate transfer member to ground or an applied potential.

3. An electrostatographic imaging process according to claim 1, wherein said intermediate transfer member dissipates internal space charge from said intermediate transfer member to ground or an applied potential.

4. An electrostatographic imaging process according to claim 1, wherein said receiving substrate is selected from the group consisting of a copy sheet and a second intermediate transfer member.

5. An electrostatographic imaging process according to claim 1, wherein the film base layer of said intermediate transfer member consists essentially of a polycarbonate resin having charge enabling particles disposed therein.

6. An electrostatographic imaging process according to claim 5, wherein the charge enabling particles comprise at least one member selected from the group consisting of tin, tin oxides, aluminum, aluminum oxides, iron, iron oxides, chromium, chromium oxides, carbon black and graphite.

7. An electrostatographic imaging process according to claim 5, wherein the polycarbonate resin is selected from the group consisting of poly(4,4'-dipropylidene-diphenylene carbonate), poly(4,4'-isopropylidene-diphenylene carbonate), polyether carbonate and 4,4'-cyclohexylidene diphenyl polycarbonate.

8. An electrostatographic imaging process according to claim 1, wherein the film base layer of said intermediate transfer member consists essentially of a metal.

9. An electrostatographic imaging process according to claim 8, wherein the metal comprises at least one member selected from the group consisting of iron, nickel, copper, aluminum, cobalt, tin, titanium, zinc, chromium and alloys thereof.

10. An electrostatographic imaging process according to claim 1, wherein the adhesive layer of said intermediate transfer member comprises acrylic adhesive, polyester, polyvinylbutyral, polyvinylpyrrolidone, polyurethane or a mixture thereof.

11. An electrostatographic imaging process according to claim 10, wherein the acrylic adhesive is selected from the group consisting of methyl methacrylate, methacrylate copolymer, ethyl methacrylate, butyl methacrylate, polymethyl methacrylate and blends thereof.

12. An electrostatographic imaging process according to claim 1, wherein the charge relaxation particles comprise at least one member selected from the group consisting of barium titanate, titanium dioxide, tin oxide, antimony tin oxide, calcium silicate, magnetite, ultra marine blue, cobalt aluminum blue, chrome-cobalt-aluminate, chromium oxide, quinacridone, diarylide yellow pigment, iron oxide, titanium-chrome oxide, phthalocyanine, zinc oxide, and cadmium sulfoselenide.

13. An electrostatographic imaging process according to claim 1, wherein the thermoplastic film forming polymer comprises at least one member selected from the group consisting of polyvinyl fluoride, polyvinylidene fluoride, polytetrafluoroethylene, polyvinyl chloride, polyethylene, polypropylene, polyethers, styrene-butadiene copolymers, polybutylenes, polyamides, polyesters, polysulfones, polysulfides, cellulosic resins, polyarylate acrylics, polyaryl sulfones, polyphenylene sulfides, polyurethanes, polyimides, epoxys, poly(amide-imides), copolyesters, polyether sulfones, polyether imides, and polyaryl ethers.

14. An electrostatographic imaging process according to claim 1, wherein a thickness of the top layer of said intermediate transfer member ranges from about 0.5 mils to about 2 mils.

15. An electrostatographic imaging process according to claim 1, wherein a thickness of the film base layer of said intermediate transfer member ranges from about 1 mil to about 5 mils.

16. An electrostatographic imaging process according to claim 1, wherein volume resistivity of the film base layer of said intermediate transfer member is less than about $10^{12}$ ohm-cm.

17. An electrostatographic imaging process according to claim 1, wherein surface resistivity of the film base layer of said intermediate transfer member is greater than about $10^7$ ohms/square.

18. An electrostatographic imaging process according to claim 1, wherein volume resistivity of the top layer of said intermediate transfer member is above about $10^{10}$ ohm-cm to below about $10^{12}$ ohm-cm.

19. An electrostatographic imaging process according to claim 1, wherein the top layer of said intermediate transfer member has a dielectric thickness of about 200 µm.

20. An electrostatographic imaging process according to claim 1, wherein volume resistivity of the top layer of said intermediate transfer member is greater than about $10^{12}$ ohm-cm and the top layer has a dielectric thickness of less than about 15 microns.

* * * * *